United States Patent [19]

Bitschkus et al.

[11] Patent Number: 4,852,864
[45] Date of Patent: Aug. 1, 1989

[54] HYDRAULIC-DAMPING TWO-CHAMBER ENGINE MOUNT

[75] Inventors: Horst Bitschkus, Hilgert; Manfred Hofmann, Hünfelden; Karl-Heinz Klöckner, Niederwerth; Uwe Nelles, Bonn; Günther Siewert, Deesen, all of Fed. Rep. of Germany

[73] Assignee: Metzeler GmbH, Munich, Fed. Rep. of Germany

[21] Appl. No.: 246,506

[22] Filed: Sep. 19, 1988

[30] Foreign Application Priority Data

Sep. 18, 1987 [DE] Fed. Rep. of Germany ....... 3731495

[51] Int. Cl.$^4$ .................... F16M 5/00; B62D 21/00
[52] U.S. Cl. .................................... 267/219; 180/312
[58] Field of Search ................. 267/35, 140.1, 219; 180/300, 312; 248/562, 636, 638; 123/192 R, 195 A

[56] References Cited

U.S. PATENT DOCUMENTS 4,711,206 12/1987 Andra et al. ................. 267/140.1 X
4,756,515 7/1988 Kuroda et al. ................. 267/219 X
4,787,611 11/1988 Sciortino .......................... 267/140.1

*Primary Examiner*—Robert J. Oberleitner
*Attorney, Agent, or Firm*—Herbert L. Lerner; Laurence A. Greenberg

[57] ABSTRACT

A hydraulic-damping two-chamber engine mount includes a working chamber facing toward an engine, a compensating chamber, and an intermediate plate separating the chambers from each other and having an overflow conduit extending helically therein through which the chambers communicate hydraulically with one another. The intermediate plate has two sides and an outer periphery merging into a cylindrical ring extending beyond both of the sides. The ring has an outer surface with two axially superposed conduits formed therein having ends and extending over at least a portion of the outer periphery of the intermediate plate. The intermediate plate has a longitudinal axis and has a conduit portion formed therein extending obliquely relative to the longitudinal axis through which one end of each of the superposed conduits communicate with each other. An outer conduit wall in the form of a cylindrical mount housing has an inner wall surface covering the superposed conduits. The cylindrical ring has corresponding radially inwardly oriented openings formed therein through which the other end of the superposed conduits communicate with the working chamber and with the compensating chamber.

7 Claims, 2 Drawing Sheets

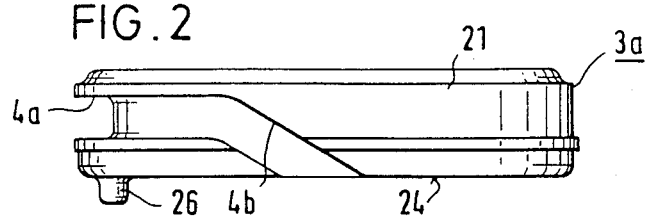
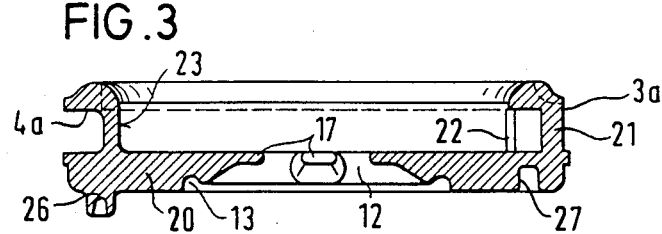
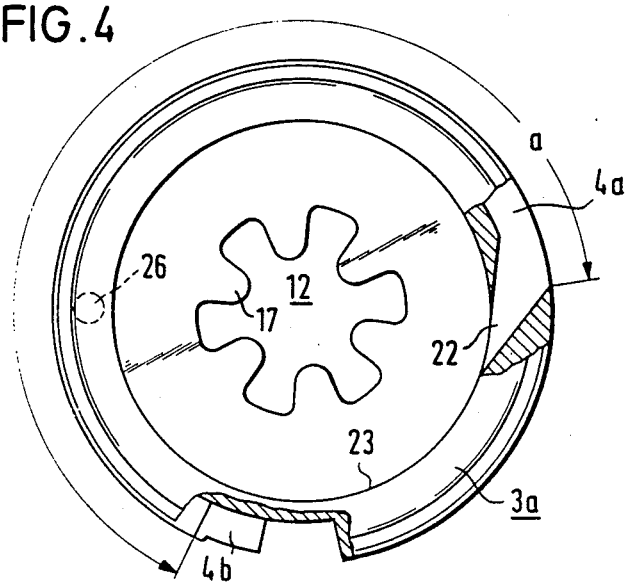
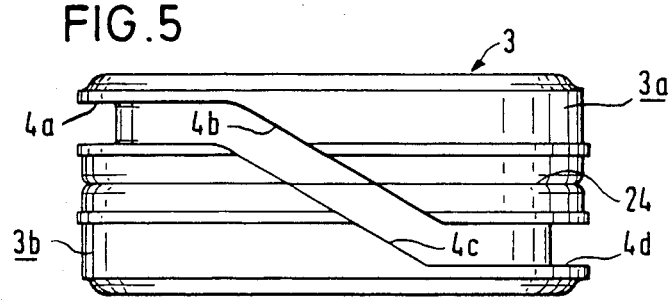

HYDRAULIC-DAMPING TWO-CHAMBER ENGINE MOUNT

The invention relates to a hydraulic-damping two-chamber engine mount with a working chamber on the side facing toward the motor and a compensating chamber partitioned off from the working chamber by an intermediate plate, the working chamber and compensating chamber communicate hydraulically with one another through an overflow conduit extending helically in the intermediate plate.

A two-chamber engine mount of this type is known, for instance, from German Published, Non-Prosecuted Application DE-OS No. 35 26 686, corresponding to U.S. Pat. No. 4,711,206. The quantity of liquid in the overflow conduit is substantially responsible for the damping action of such a mount. Upon vibrations of higher amplitudes, this quantity of liquid vibrates practically in resonance as an additional quenching mass, and thus effects damping. An additional damping action is produced by the friction of this column of liquid along the wall. The result is a damping maximum at a special frequency, with the location of this frequency depending substantially on the length of the overflow conduit and its cross section. In motor vehicle engines, vibration maxima generally occur between 8 and 15 Hz, so that the corresponding damping maximum should be adjusted to these frequencies as well. With certain engine types, however, these vibration maxima also occur at lower frequencies. In order then to shift the damping maximum of such a mount downward, or in other words into the range of lower frequencies, the primary requirement is that the length of the overflow conduit be increased. In conventional hydraulic-damping engine mounts of this generic type, such an overflow conduit extends helically over a variably large circumferential zone of a circle and for structural reasons can attain a maximum of no more than approximately 300°, because space must still be left on the periphery for the inlet and outlet openings.

However, there are limits to lengthening such a conduit, unless the diameter is correspondingly reduced, which would cause the conduit to contain an excessively small quantity of fluid. However, it can be demonstrated that if the frequency for the maximum damping is reduced from 12 Hz to 6 Hz, for example, the overflow conduit length must be tripled, with approximately the same cross section, in order to attain the corresponding low-frequency damping.

It is accordingly an object of the invention to provide a hydraulic-damping two-chamber engine mount, which overcomes the hereinafore-mentioned disadvantages of the heretofore-known methods and devices of this general type and which contains an overflow conduit of such great length that lower-frequency vibrations can be optimally damped with it as well.

With the foregoing and other objects in view there is provided, in accordance with the invention, a hydraulic-damping two-chamber engine mount, comprising a working chamber facing toward an engine, a compensating chamber, an intermediate plate separating the chambers from each other and having an overflow conduit extending helically therein through which the chambers communicate hydraulically with one another, the intermediate plate having two sides and an outer periphery merging into a cylindrical ring extending beyond both of the sides, the ring having an outer surface with two axially superposed conduits formed therein having ends and extending over at least a portion of the outer periphery of the intermediate plate, the intermediate plate having a longitudinal axis and having a conduit portion formed therein extending obliquely relative to the longitudinal axis of the plate or the mount through which one end of each of the superposed conduits communicate with each other, and an outer conduit wall in the form of a cylindrical mount housing with an inner wall surface covering the superposed conduits, the cylindrical ring having corresponding radially inwardly oriented openings formed therein through which the other ends of the superposed conduits communicate with the working chamber and with the compensating chamber.

This structure having two annularly superposed conduit portions and a disposition thereof on the largest possible diameter of the intermediate plate, makes it possible to attain conduit lengths that produce an optimal damping at considerably lower frequencies than was previously possible with conduits in a single plane.

In accordance with another feature of the invention, the intermediate plate is formed of two identical plate halves each having a flat base plate with an edge and an outer periphery at which a portion of the cylindrical ring is disposed, each of the portions of the cylindrical ring having an outer surface with one of the superposed conduits being formed therein over a portion of the periphery of the intermediate plate and being open toward the outside, the conduit portions each having one end bent obliquely at an angle relative to the longitudinal axis of the intermediate plate or the mount intersecting the edge of the base plate and another end merging with a respective one of the outlet openings, the cylindrical ring portions each having an inner periphery tangentially intersected by a respective one of the outlet openings.

In accordance with a further feature of the invention, the intermediate plate halves have encompassing ribs on the outer periphery thereof sealing the intermediate plate to the housing.

In accordance with an added feature of the invention, the flat base plates of the intermediate plate halves have surfaces mounted on one another in mirror-inverted fashion with the conduit portions in mutual alignment.

In accordance with an additional feature of the invention, the intermediate plate halves have outer upper and lower edges, and there are provided axially-radially acting sealing rings, one of the sealing rings being clamped between the housing and the outer upper edge of one of the intermediate plate halves and the other of the sealing rings being clamped between the housing and the outer lower edge of the other of the intermediate plate halves.

In accordance with yet another feature of the invention, there is provided a support spring partially defining the working chamber and a chamber wall partially defining said compensating chamber, the sealing rings each being integrally formed onto a respective one of the support spring and the chamber wall.

In accordance with a concomitant feature of the invention, the flat base plates of the intermediate plate halves have surfaces mounted on one another in mirror-inverted fashion with the conduit portions in mutual alignment, and there is provided a rubber-elastic decoupling diaphragm fastened in place between the intermediate plate halves in a central opening formed in the intermediate plate halves.

Other features which are considered as characteristic for the invention are set forth in the appended claims.

Although the invention is illustrated and described herein as constructed in a hydraulic-damping two-chamber engine mount, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 2 is a side-elevational view of one half of an intermediate plate;

FIG. 3 is a longitudinal-sectional view of the intermediate plate half according to FIG. 2;

FIG. 4 is a top-plan view of the intermediate plate of FIGS. 2 and 3 with conduit ends which are partially broken away; and FIG. 5 is a side-elevational view of a complete intermediate plate made from two intermediate plate halves.

Figure 1:
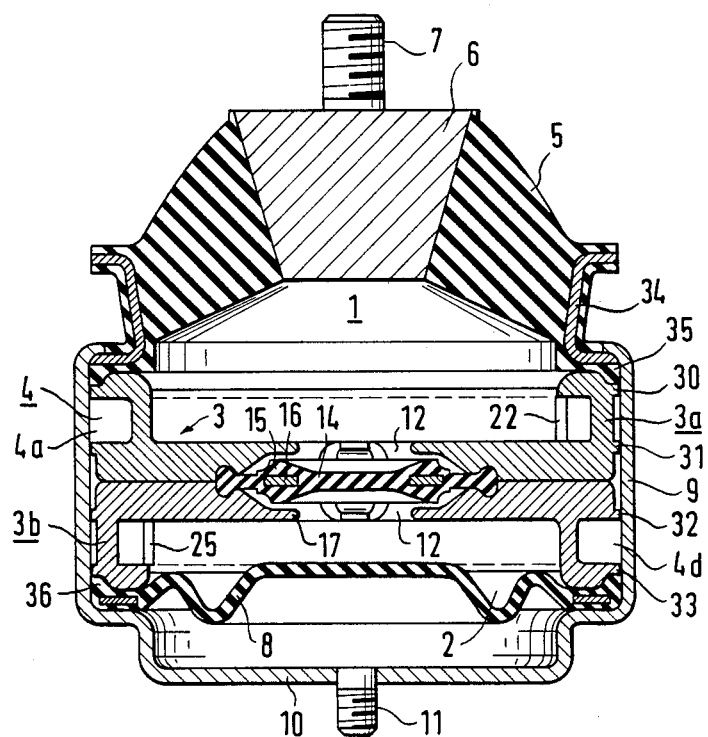
FIG. 1 is a diagrammatic, longitudinal-sectional view of an engine mount according to the invention.

Referring now to the figures of the drawing in detail and first, particularly, to FIG. 1 thereof, there is initially seen a two-chamber engine mount conventionally provided with an upper working chamber 1 toward the engine and a lower compensating chamber 2, which communicate with one another through an overflow conduit 4 extending in an intermediate plate 3 to be described in further detail below. The upper working chamber 1 is defined by a thick-walled, hollow, conical chamber wall 5, which is a so-called support spring having a bearing plate 6 at the upper end surface thereof with a bolt 7 for fastening to a non-illustrated engine. The lower chamber 2 is defined by a chamber wall 8 which may be cup-shaped and is also formed of rubber-elastic but softer material than that of the chamber wall 5. All of the parts of the mount are braced against one another in a fluid-tight manner by a cylindrical housing 9. The housing also includes a lower housing cap 10 having a connection bolt 11 for fastening the mount to the vehicle body which is not illustrated.

As the drawing shows, the intermediate plate 3 is formed of two identical intermediate plate halves 3a and b, which are put together in mirror-inverted fashion and which will be described in further detail below.

As FIGS. 2, 3 and 4 show, the upper intermediate plate half 3a is formed of a flat base plate 20, which merges with a portion of a cylindrical ring 21 toward one side of the outer periphery thereof. A conduit 4a that is open toward the outside is cut into the outer peripheral surface of the ring 21, across a peripheral zone a shown in FIG. 4. The conduit 4a extends over approximately 270° in the illustrated embodiment. One end of the conduit 4a merges with a tangentially directed opening 22 at an inner periphery 23 of the ring 21, while the other end extends onward in the form of a conduit portion 4b bent at an oblique angle relative to the longitudinal axis of the mount in the direction toward the lower surface 24 of the base plate 20 and freely intersects the lower surface 24

If two such identically constructed intermediate plate halves 3a and 3b are joined at the lower surfaces 24 thereof, they provide a conduit course and an intermediate plate 3 as shown in a side view in FIG. 5. In order to provide optimal association with one another and locking of the two intermediate plate halves 3a and 3b, a pin 26 and a corresponding recess 27 are also provided, as shown in FIG. 3 below the base plate 20. When two plate halves are joined in mirror-inverted fashion, the pin 26 of one plate engages the recess 27 of the other plate, and vice versa. When viewing FIG. 3 together with the longitudinal section of FIG. 1, the conduit 4 accordingly extends first from the tangentially inwardly oriented inlet opening 22 in the working chamber 1 through the horizontal conduit portion 4a and the upper intermediate plate half 3a as far as the obliquely extending conduit portion 4b and another obliquely extending conduit portion 4c, which abut one another in aligned fashion, and then through an ensuing horizontal conduit portion 4d in the lower intermediate plate half 3b which is attached in mirror-inverted fashion, and it discharges into the compensating chamber 2 at an outlet opening 25 which is also oriented tangentially inward.

When the mount is assembled, the conduit portions 4a, b, c and d which are initially open toward the outside are laterally sealingly covered by the inner wall of the housing 9, so that the housing wall 9 virtually forms the fourth side of the conduit. However, the conduit 4 is thus also located on a circle or helix that has the maximum possible attainable diameter, assuming a predetermined outside diameter of the mount.

A critical factor in this respect is the sealing of the pressed-on housing wall 9 toward the periphery of the two intermediate plate halves 3a and b, especially if the parts are not exactly round and since there is metal-to-metal contact at that location. Therefore, for sealing purposes, the intermediate plate halves 3a and 3b first have respective slightly raised encompassing ribs 30, 31 and 32, 33, against which the housing 9 is pressed when it is rolled on, thus already assuring adequate sealing.

In addition, an axially and radially sealing ring 35, which may be constructed integrally with the support spring 5, is provided between the outer upper edge of the intermediate plate half 3a and the inwardly rolled edge of the housing 9 or a peripheral ring 34 of the support spring 5. In the same manner, a ring 36 is provided on the outer lower edge of the intermediate plate half 3b, which axially and radially seals off the gap toward the housing 9 or cap 10 and the compensating chamber 2. The ring 36 may similarly be constructed integrally with the chamber wall 8.

In the illustrated embodiment, an overflow conduit having a circumferential angle of approximately 540° is thus obtained. However, a corresponding lengthening or shortening of the horizontally extending portions in the two intermediate plate halves 3a and 3b can provide any other desired conduit length over an angle of up to 700°.

As shown in FIGS. 1 and 3, the two intermediate plate halves 3a and 3b may also have a central opening 12 with undercuts 13 formed at the outer periphery thereof. A rubber-elastic diaphragm 14 for decoupling vibrations of low amplitude and high frequency is clamped in place in the opening 12 between the corresponding undercuts 13. The diaphragm 14 may be constructed in the conventional manner as a flat plate, or as shown in the illustrated embodiment with a reinforced annular zone 15 having an inserted reinforcement ring 16 and overlapping ribs 17 effecting a travel limitation if a predetermined vibration amplitude is exceeded.

With the above-described structure of the intermediate plate, it is accordingly possible in a simple manner to obtain conduits of even greater length over a circumferential angle of at least 360°, and moreover a relatively large conduit cross section can still be maintained.

We claim:

1. Hydraulic-damping two-chamber engine mount, comprising a working chamber, a compensating chamber, an intermediate plate separating said chambers from each other and having an overflow conduit extending helically therein through which said chambers communicate hydraulically with one another, said intermediate plate having two outer surfaces and an outer periphery merging into a cylindrical ring extending beyond both of said outer surfaces, said ring having an outer surface with two axially superposed conduits formed therein having ends and extending over at least a portion of the outer periphery of said intermediate plate, said intermediate plate having a longitudinal axis and having a conduit portion formed therein extending obliquely relative to the longitudinal axis through which one end of each of said superposed conduits communicate with each other, and an outer conduit wall in the form of a cylindrical mount housing with an inner wall surface covering said superposed conduits, said cylindrical ring having corresponding radially inwardly oriented openings formed therein through which the other ends of said superposed conduits commuicate with said working chamber and with said compensating chamber.

2. Engine mount according to claim 1, wherein said intermediate plate is formed of two identical plate halves each having a flat base plate with an edge and an outer periphery at which a portion of said cylindrical ring is disposed, each of said portions of said cylindrical ring having an outer surface with one of said superposed conduits being formed therein over a portion of the periphery of said intermediate plate and being open toward the outside, said conduit portions each having one end bent obliquely at an angle relative to the longitudinal axis of said intermediate plate intersecting said edge of said base plate and another end merging with a respective one of said outlet openings, said cylindrical ring portions each having an inner periphery tangentially intersected by a respective one of said outlet openings.

3. Engine mount according to claim 2, wherein said intermediate plate halves have encompassing ribs on the outer periphery thereof sealing said intermediate plate to said housing.

4. Engine mount according to claim 3, wherein said flat base plates of said intermediate plate halves have surfaces mounted on one another in mirror-inverted fashion with said conduit portions in mutual alignment.

5. Engine mount according to claim 4, wherein said intermediate plate halves have outer upper and lower edges, and including axially-radially acting sealing rings, one of said sealing rings being clamped between said housing and said outer upper edge of one of said intermediate plate halves and the other of said sealing rings being clamped between said housing and said outer lower edge of the other of said intermediate plate halves.

6. Engine mount according to claim 5, including a support spring partially defining said working chamber and a chamber wall partially defining said compensating chamber, said sealing rings each being integrally formed onto a respective one of said support spring and said chamber wall.

7. Engine mount according to claim 2, wherein said flat base plates of said intermediate plate halves have surfaces mounted on one another in mirror-inverted fashion with said conduit portions in mutual alignment, and including a rubber-elastic decoupling diaphragm fastened in place between said intermediate plate halves in a central opening formed in said intermediate plate halves.

* * * * *